United States Patent [19]

Murphy et al.

[11] 4,395,162
[45] Jul. 26, 1983

[54] CARTRIDGE FOR USE IN ANCHOR BOLTING

[75] Inventors: John M. Murphy, Mansfield; Robert H. Spensley, Swanwick; John Ellis, Sutton in Ashfield, all of England

[73] Assignee: Societe Anonyme d'Explosifs et de Produits Chimiques, Paris, France

[21] Appl. No.: 277,343

[22] Filed: Jun. 25, 1981

[30] Foreign Application Priority Data

Jul. 23, 1980 [GB] United Kingdom ................. 8024033

[51] Int. Cl.³ ...................... E21D 20/02; B65D 25/08
[52] U.S. Cl. .................................. 405/261; 206/219; 405/260
[58] Field of Search .............................. 405/259–261; 206/219, 220

[56] References Cited

U.S. PATENT DOCUMENTS

| 3,367,785 | 2/1968 | Finucane et al. | 206/219 X |
| 3,419,258 | 12/1968 | Ritchie | 206/219 |
| 3,830,475 | 8/1974 | Inoue et al. | 206/219 X |
| 4,096,944 | 6/1978 | Simpson | 206/219 |

FOREIGN PATENT DOCUMENTS

| 2202548 | 5/1974 | France . | |
| 2290365 | 6/1976 | France | 206/219 |
| 1293619 | 10/1972 | United Kingdom | 405/261 |
| 3851A | 9/1978 | United Kingdom . | |
| 4965A | 9/1978 | United Kingdom . | |

*Primary Examiner*—Taylor Dennis L.
*Attorney, Agent, or Firm*—Wood, Dalton, Phillips, Mason & Rowe

[57] ABSTRACT

Reinforcing or fixing elements such as anchor bolts are anchored in a borehole drilled in a substrate such as an underground mine roof with an anchoring cartridge in which a particulate liquid-settable solid component, for example a hydraulic cement, is contained in a liquid-impermeable casing, the solid occupying a volume which is less than the normal free volume of the casing and the cartridge being at least partially evacuated so as to cause the casing to be in contact with the solid component over substantially its whole length within the casing. This ensures that when the cartridge is immersed in an activating liquid, for example water, and the casing perforated, the activating liquid is drawn rapidly into the evacuated space adjacent the solid component over its whole length thereby helping to ensure the formation of a self-setting grouting composition of uniform strength when the cartridge is used.

6 Claims, 3 Drawing Figures

CARTRIDGE FOR USE IN ANCHOR BOLTING

This invention relates to the anchoring of reinforcing or fixing elements such as anchor bolts in a borehole drilled in a substrate such as an underground mine roof, and is concerned with an anchoring cartridge containing a liquid-settable solid component, which in use is brought into contact with an activating liquid component capable of reacting therewith to form a self-setting grouting composition.

Two principal non-mechanical methods of anchoring a reinforcing element in a borehole in a substrate have been utilised, one based on hydraulic cement systems and the other on hardenable synthetic resin systems, generally an unsaturated polyester resin system. Both systems have been employed as cartridged systems, in which the reactive components of the system are both packaged in a frangible cartridge, generally in separate compartments, and the cartridge is introduced into the borehole and then broken and the contents mixed in situ by means of a rotating reinforcing element to form a self-setting grouting composition around the reinforcing element.

Cartridges containing unsaturated polyester resin systems exhibit high flammability and toxicity and hence their use in confined areas such as coal mines gives rise to an unacceptable risk which has recently become of increasing concern and which has therefore given rise to increased interest in the use of cartridged hydraulic cement systems, additionally because of the increasing cost of polyester resins resulting from higher oil prices.

French Patent Specification No. 2202548 (which corresponds to German Offenlegungsschrift No. 2350298) describes a cartridge in which a rapidly setting dry hydraulic cement mortar is packaged in a porous paper tube. When required for use, the paper tube is immersed in water for a time sufficient to allow water to penetrate through the tube and hydrate the dry mortar and the moistened tube is then inserted into the borehole prior to insertion of the reinforcing element. This cartridge has disadvantages, the major one being that the porous tube becomes weakened after immersion in water and hence is difficult to handle when wet particularly if the cartridge is longer than about 200 mm.

A similar immersion-activated cartridge is described in British Patent Specification No. 2004965A, the cartridge casing consisting of a liquid-permeable paper or a perforated plastics film material, but also having a rigidifying member, for example a rigid but brittle plastics netting, which serves to make the moistened cartridge more manageable.

Cartridges such as those described in the aforementioned prior specifications, i.e. cartridges which must be activated by immersion in water prior to insertion in a borehole, suffer from a number of disadvantages, for instance:

1. It is necessary to pack the cartridges in an outer waterproof container.
2. Immersion time is critical—about 3 minutes is required which can cause practical difficulties, since oversoaking of the cartridges may cause absorption of too much water and hence an increase above the optimum water/cement ratio. This is particularly a problem in hydraulically setting systems containing significant quantities of aggregate or other fillers. The rate of water absorption and the total quantity absorbed is largely dependent on the bulk density of the dry mortar mix within the cartridge and this may vary considerably during transport and storage prior to use.
3. In the case where the cartridge casing is formed from a perforated plastics film, a proportion of the hydratable powder tends to escape from the casing so that the cartridges are unpleasant to handle.
4. Similarly after immersion a proportion of the wetted mortar tends to seep from the casing so that again handling is unpleasant.
5. In practice the cartridge filling is limited to simple dry powder cement admixtures, since the presence of other materials, for example, plasticisers or accelerators, can give rise to practical difficulties when the cartridge is activated by immersion in water during underground mining and tunnelling operations.

It is an object of the present invention to provide an anchoring cartridge based on a liquid-activated solid component which mitigates the disadvantages possessed by the immersion-activated cartridges described above.

Other features and advantages of the invention will be apparent from the following description taken in connection with the accompanying drawing wherein.

Figure 1:
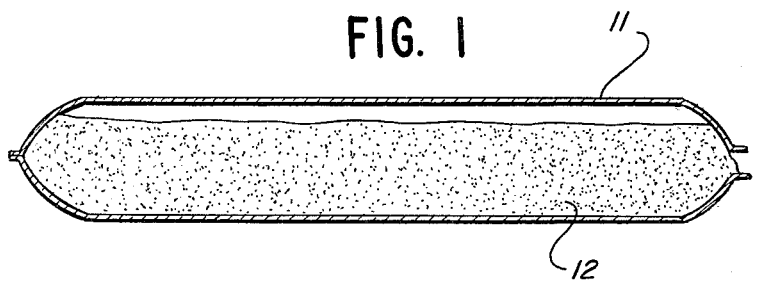
FIG. 1 is a schematic sectional view illustrating the anchoring cartridge casing having a body of liquid-settable solid component disposed therein prior to the sealing closure of the casing.
Figure 2:
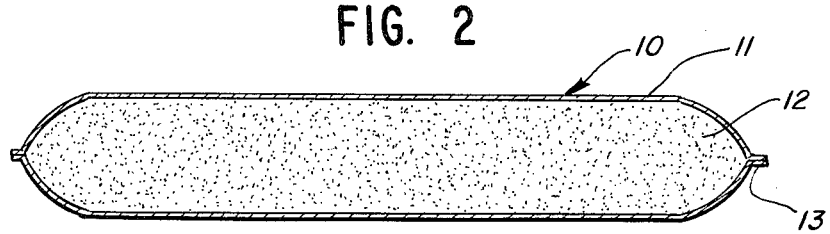
FIG. 2 is a schematic view similar to that of FIG. 1 but illustrating the anchoring cartridge in the evacuated sealingly closed form.
Figure 3:
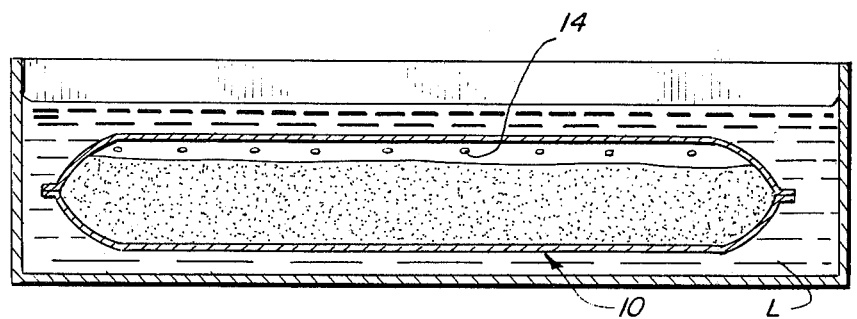
FIG. 3 is a schematic view illustrating the provision of perforations in the cartridge casing for conducting liquid therethrough into the casing upon immersion thereof in a body of solid component-setting liquid.

According to the invention, as illustrated in the drawing there is provided an anchoring cartridge 10 for use in anchoring a reinforcing or fixing element in a borehole in a substrate, the cartridge comprising a frangible casing 11 formed from an inert, liquid-impermeable material, the casing containing a particulate liquid-settable solid component 12 in an amount such that it occupies a volume which is less than the normal free volume of the casing, and the cartridge being at least partially evacuated so as to cause the casing to be in contact with the solid component over substantially its whole length within the casing, as seen in FIG. 2.

When required for use, the anchoring cartridge of the invention is fully immersed in a liquid capable of reacting with the particulate solid component to form a self-setting grouting composition and the casing is then perforated as at 14 to allow the activating liquid to be drawn rapidly into the evacuated space adjacent the particulate solid component within the casing. The presence of the evacuated space within the cartridge casing helps to accelerate the activation of the liquid-settable solid component over the whole length of the solid component within the cartridge and thereby helps to ensure the formation of a self-setting grouting composition of substantially uniform strength when the activated cartridge is introduced into a borehole and then broken and the contents mixed in situ by means of a rotating reinforcing or fixing element to form the required self-setting grouting composition around the reinforcing or fixing element. The evacuated space within the cartridge also serves to minimise the inclusion of air within the activated cartridge, which not only helps to retain the cartridge in a sufficiently rigid state to assist the insertion of the activated cartridge into a borehole, but also helps to ensure effective void-free anchoring of the reinforcing or fixing element in the borehole.

If necessary, mixing of the particulate solid component with the activating liquid may be assisted by external manipulation of the cartridge casing.

The frangible casing of the cartridge can be made from any material which is not permeable to, or readily attacked by, the contents of the cartridge or the activating liquid in which it is to be immersed and which is sufficiently flexible to collapse on to the solid component when the cartridge is evacuated and to rupture under the force of stemming the cartridge in a borehole or of inserting an anchor bolt through the cartridge. To facilitate the latter operation, relatively weak materials are preferred for use as the cartridge casing. Examples of these are tubular thermoplastics film, e.g. polyester, polyethylene, polyamide, polyvinyl chloride or polyvinylidene chloride film, laminate film, e.g. thermoplastics/thermoplastics or thermoplastics/cellulose laminates, waterproofed paper/cloth laminates, metal foil and laminates of metal foil with plastics or paper sheeting. These materials are flexible and allow the cartridge to be manipulated so as to aid mixing of the liquid and solid components.

The sealing of the cartridge casing, as at 13, after evacuation may be effected in any suitable manner, for example by heat sealing, stitching, clipping, tying or the use of an adhesive.

The particulate liquid-settable solid component, which in the context of the present invention means a non-fluid component, i.e. a component which will not readily flow within the cartridge casing, may be in the form of discrete pellets, granules, tablets or capsules, or in the form of a powder.

The liquid-settable component may be a hydraulic cement, for example a Portland cement, high alumina cement, blast furnace cement, pozzolanic cement or calcium sulphate (gypsum) plaster, either alone or in admixture, in which case the activating liquid component in which the cartridge will be immersed will comprise water. Other modifying inorganic materials, for example lime, anhydrite, fly ash or other pozzolans, may be present in the hydraulic cement component, together with metals or inorganic salts to accelerate or retard the rate of hydration and/or strength development and to promote expansion or minimise shrinkage. Such inorganic additives are well known in the art and include, for example, sulphoaluminates, finely-divided metals such as iron, aluminium and zinc, and ammonium, sodium, potassium, lithium, calcium, magnesium, zinc and aluminium salts of inorganic or organic acids.

Other organic materials may be present as plasticisers, or as agents for the control of air entrainment, rheology or setting rate.

Organic polymers may be used to modify the physical characteristics of the hydraulic materials. The polymers may be present in the form of dry powders or granules which may be dissolved or dispersed in the solid component. Such polymers include water-soluble resins, for example urea-formaldehyde or melamineformaldehyde resins, polyacrylic acids or acrylic esters, or thermoplastic emulsion or suspension polymers.

Besides the particulate self-setting systems based on hydraulic cements, there may be used systems based on other settable inorganic materials, for example a system comprising:

(a) at least one acidic oxyphosphorus compound selected from phosphoric acids, e.g. $H_3PO_4$, anhydrides of phosphoric acid, e.g. $P_2O_5$, and salts of phosphoric acid with multivalent metal cations, e.g. $Al(H_2PO_4)_3$; and (b) a particulate basic component comprising at least one particulate basic compound of a Group II or Group III metal capable of reacting with the oxyphosphorus compound in the presence of water as the activating liquid to form a monolithic solid, e.g. magnesium oxide or hydroxide, magnesium silicate, magnesium aluminate or calcium aluminate. Alternatively only the particulate basic component (b) may be contained in the cartridge casing and an aqueous solution of the oxyphosphorus compound (a) may be used as the activating liquid.

A further example of an inorganic settable composition usable in the cartridge of the invention comprises, in essence, burned magnesite as the solid component and an aqueous solution of magnesium chloride and/or magnesium sulphate as the activating liquid component. Alternatively a dry powder mixture of burned magnesite and magnesium chloride may comprise the solid component contained in the cartridge casing, in which case the activating liquid can comprise water.

The solid component present in the cartridge may contain particulate fillers, for example silica, calcite, limestone, dolomite or granite and/or fibrous fillers, for example asbestos, glass fibre, steel fibre, rock wool, cellulose fibres, shredded paper, or synthetic resin fibres, e.g. polyamide, polyolefin or polyester fibre. The use of a proportion of fibrous filler may assist liquid penetration into the solid component.

The following Examples illustrate the invention.

EXAMPLE 1

Cylindrical pellets, 5 mm in diameter and 5 mm in length, were formed from high alumina cement dampened with 2 percent by weight of glyceryl monooleate. The pellets were packed into a tubular film casing formed from a laminate of cellulose and polyethylene. The tubular casing had an internal diameter of 40 mm and a length of 400 mm. One end of the casing was heat sealed prior to packing with the cylindrical pellets. When the casing had been filled with the pellets over a length of 350 mm, a vacuum was applied to the open end to partially evacuate the air from the voids. While maintaining the vacuum, the open end of the casing was closed by heat sealing.

The resulting cartridge was held under water and on perforating the casing, water entered rapidly to occupy approximately 70 percent of the void volume between the pellets. The cartridge was then withdrawn from the water and manipulated by hand so that all the pellets were contacted with the water which had entered the casing. Within 30 seconds, the pellets absorbed the water and broke down to form a cementitious slurry of homogeneous consistency.

Two cartridges prepared and activated in the foregoing manner were used to anchor a 25 mm diameter steel reinforcing bar in a 45 mm borehole drilled in concrete to a depth of 500 mm. The cementitious slurry set in 3 hours and after 21 hours a tensile load was applied to the anchored bar. An applied load of 20 tons was withstood without failure of the bar or anchorage.

EXAMPLE 2

Spherical pellets, 10 mm in diameter, were produced from a hydraulic cement mixture comprising ordinary Portland cement and 6 percent by weight of finely ground anhydrous calcium chloride and dampened with 2 percent by weight of propylene glycol monoacetate. Cartridges were formed with these spherical pellets in a manner similar to that described in Example 1 and activated by perforating under water. The water entered to occupy approximately 50 percent of the void volume. The pellets absorbed the water and formed homogeneous cementitious slurry within one minute.

Two cartridges prepared and activated in the foregoing manner were used to anchor a 25 mm diameter reinforcing bar in a 43 mm borehole drilled in concrete to a depth of 500 mm. The cementitious slurry set in 15 minutes and a tensile test was applied to the bar after 5 hours. No failure occurred up to an applied load of 20 tons.

We claim:

1. An anchoring cartridge for use in anchoring a reinforcing or fixing element in a borehole in a substrate, said cartridge comprising:
   a frangible flexible, sealed casing formed from an inert, liquid-impermeable material; and
   a particulate liquid-settable solid component in said casing, said cartridge being at least partially evacuated so as to cause the casing to be in contact with the solid component over substantially its whole outer surface within the casing, said casing material being perforable to permit ingress of liquid therethrough upon perforation thereof and upon immersion in a body of the component-setting liquid.

2. A cartridge as claimed in claim 1, wherein the solid component is a hydraulic cement.

3. A method of anchoring a reinforcing or fixing element in a borehole in a substrate, which comprises selecting at least one anchoring cartridge comprising a frangible casing formed from an inert, liquid-impermeable material, the casing containing a particulate liquid-settable solid component in an amount such that it occupies a volume which is less than the normal free volume of the casing, and the cartridge being at least partially evacuated so as to cause the casing to be in contact with the solid component over substantially its whole length within the casing, immersing said cartridge in a liquid capable of reacting with said liquid-settable solid component to form a self-setting grouting composition, perforating the casing of the immersed cartridge to allow said liquid to be drawn rapidly into the evacuated space adjacent the solid component, withdrawing the perforated cartridge from said liquid, inserting the cartridge into a borehole and thereafter inserting a reinforcing or fixing element into the borehole in a manner such as to rupture the cartridge and cause the contents thereof to form a grouting composition around the element which when set will anchor the element in the borehole.

4. A method according to claim 3, wherein the solid component is a hydraulic cement and the liquid is water.

5. A method according to claim 3 or 4, wherein after withdrawal of the cartridge from the liquid, the cartridge is subjected to external manipulation to assist mixing of the solid component with said liquid.

6. A cartridge as claimed in claim 1 wherein the component-setting liquid is water.

* * * * *